United States Patent

Greenspan et al.

Patent Number: 5,956,427
Date of Patent: Sep. 21, 1999

[54] DFT ENCODING OF ORIENTED FILTER RESPONSES FOR ROTATION INVARIANCE AND ORIENTATION ESTIMATION IN DIGITIZED IMAGES

[75] Inventors: Hayit Greenspan; Serge Belongie, both of Pasadena, Calif.

[73] Assignee: California Institute of Technology, Pasadena, Calif.

[21] Appl. No.: 08/490,703

[22] Filed: Jun. 15, 1995

[51] Int. Cl.⁶ .............................. G06K 9/36; G06K 9/40
[52] U.S. Cl. ........................ 382/240; 382/260; 382/280
[58] Field of Search .................................. 382/291, 297, 382/305, 199, 280, 260, 156, 209, 240; 395/24; 128/653.1

[56] References Cited

U.S. PATENT DOCUMENTS

| | | | |
|---|---|---|---|
| 3,566,080 | 2/1971 | Uffelman et al. | 382/190 |
| 5,109,431 | 4/1992 | Nishiya et al. | 382/209 |
| 5,526,446 | 6/1996 | Adelson et al. | 382/275 |

OTHER PUBLICATIONS

"Digital Image Processing", R.C. Gonzalez and P. Wintz, Addison–Wesley 1977 pp. 41–47.

"Overcomplete Steerable Pyramid Filters and Rotation Invariance", H. Greenspan et al., Computer Society Conference on Computer Vision and Pattern Recognition, Seattle, 21–23, Jun. 1994.

"Digital Image Processing", R. C. Gonzalez et al., Addison–Wesley 1977, p. 335.

Local Orientation, pp. 157–163.

Multidimensional Orientation Estimation with Application to Texture Analysis and Optical Flow, IEEE Transactions on Pattern Analysis and Machine Intelligence, vol. 13, No. 8, Aug. 1991 by Josef Bigun et al.

The Design and Use of Steerable Filters, 1991 IEEE, William T. Freeman and Edward H. Adelson, pp. 891–906.

Computerized Flow Field Analysis: Oriented Texture Fields, A. Ravishankar Rao and Ramesh C. Jain, IEEE Transactions on Pattern Analysis and Machine Intelligence, vol. 14, No. 7, Jul. 1992, pp. 693–709.

Computing Oriented Texture Fields, A. Ravishankar Rao and Brian G. Schunck, Graphical Models and Image Processing, vol. 53, No. 2, Mar., pp. 157–185, 1991.

Analyzing Oriented Patterns, Michael Kass and Andrew Witkin, Computer Vision, Graphics, and Image Processing 37, 362–385 (1987).

*Primary Examiner*—Thomas D. Lee
*Assistant Examiner*—Wenpeng Chen
*Attorney, Agent, or Firm*—Fish & Richardson P.C.

[57] ABSTRACT

A technique of determining information about orientation and amount of orientation of an image. The orientations of the image are sampled, and the samples are used to reconstruct information from which all orientations can be obtained. The samples each include information about specific components of the image, and these samples are assembled into a feature vector. The feature vector is discrete Fourier transformed whereby its continuous orientation information can be obtained.

19 Claims, 2 Drawing Sheets

DFT ENCODING OF ORIENTED FILTER RESPONSES FOR ROTATION INVARIANCE AND ORIENTATION ESTIMATION IN DIGITIZED IMAGES

STATEMENT OF GOVERNMENT RIGHTS

The U.S. Government may have certain rights in this invention pursuant to Grant no. N00014-92-J-1860 awarded by the Navy.

FIELD OF THE INVENTION

The present invention defines a system using steerable filters to determine the magnitude and phase of orientations which are present locally throughout a digitized image. More specifically, the present invention uses a discrete Fourier transform ("DFT") technique to produce information about the components of multiple outputs of steerable filters to obtain this information therefrom.

BACKGROUND AND SUMMARY OF THE INVENTION

Machine vision uses a processing computer to recognize certain aspects of a visual field. A signal indicative of the visual field is processed to extract the information it represents. The processing is often effected using elements and filters that are modelled after the human visual system. Many of these devices determine energy concentration in the local spectrum to determine a particular orientation and frequency.

Machine vision uses these techniques for various recognition tasks including recognition of textures, other two dimensional patterns such as fingerprint recognition, object recognition (e.g. faces), and more.

Pyramid filters define a special kind of image filters which decompose the image into several successively smaller, lower resolution images which are band pass and/or low pass components of the original image. The term "pyramid" is based on a nickname that arises from the way that the filtered images look after application of such a filtering scheme. Original images are successively filtered and subsampled to obtain successively smaller images. The resulting set of images is called a pyramid based on appearance. Each adjacent level of the pyramid produces an output indicative of the details that were lost in the formation thereof. In pyramid processing, the resolution of the original image is successively reduced in the coarser smaller images. This is modelled after the way the human visual system operates. Human eyes simultaneously see details at close range and coarse features at a distance. The Pyramid processing breaks down the image into both these detailed and coarse portions. Each Pyramid output represents information about the image.

The Gaussian pyramid is a collection of low pass images, and the Laplacian pyramid is composed of band pass images. These filtering schemes are used to select out spatial frequencies to produce coefficients which characterize the local image area. The Laplacian pyramid is one particularly computationally efficient and compact pyramid filtering scheme.

Different varieties of these pyramids can be used to achieve different kinds of orientation selectivity, and the literature includes teachings of how to form the pyramidal filters including the "Gabor" filters and "Laplacian" Pyramidal filters.

An oriented filter primarily passes information at a specific orientation matching the orientation of the filter. The dominant orientation of an image can be obtained by applying a number of different oriented filters to the image. The image orientation is most closely matched to the orientation of the oriented filter which produces the maximum output. One approach to finding orientation of an image is to simply apply many versions of the same filter, each of which differs from the others by a small rotational angle.

Another possibility is described by Freeman and Adelson in "The Design and Use of Steerable Filters". A steerable filter is formed from a plurality of fixed-orientation "basis filters". The outputs of the basis filters are combined and interpolated between. Freeman describes how to determine a correct filter set to find the response of a filter of arbitrary orientation without explicitly applying that filter.

All angularly-band-limited filters are steerable given enough basis filters, (see Freeman & Adelson). Other pyramids which could be used according to the present invention include the Burt/Adelson pyramid or the filter-subtract-decimate ("FSD") pyramid, for example.

Orientation analysis is an important task in machine vision. The orientation strength along a particular direction $\theta$ is referred to herein as the "oriented energy" $E(\theta)$. The "dominant" orientation and the strength of the dominant orientation are estimated from this information. This information can be used to form a "orientation map" which has line lengths which are proportional to the strength S of the orientation, and a phase which indicates the direction $\theta_d$.

It is an object of the present invention to define a system which can determine orientation and phase information from images containing multi-dominant local orientations.

It is another object of the present invention to provide a system which obtains both orientation magnitude information and orientation phase information in a new and novel way.

This is done according to the present invention by obtaining both rotation variant and rotation invariant information. In one embodiment, this is done by a DFT technique.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

One common application of machine vision is to search for a particular texture in an input image based on a set of oriented filter responses. The content of the filter output is often known when the texture is oriented at a particular angle. However, it is not immediately obvious how the filter outputs may be reinterpreted when that texture is rotated. The present invention defines a structure and method for systematically processing this information.

Figure 1:
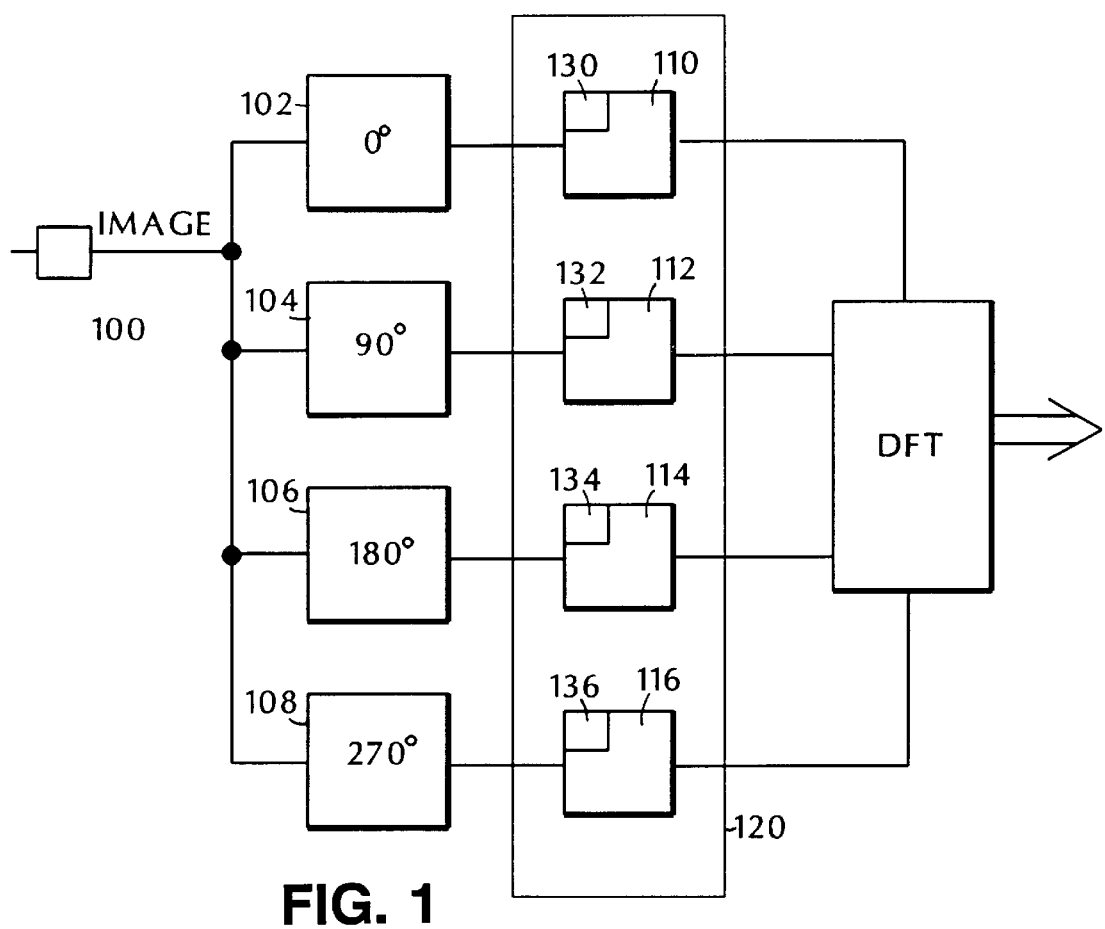
FIG. 1 shows a basic processing system of the present invention.

The preferred embodiment of the present begins with an image to be analyzed, 100 for which the Gaussian and Laplacian pyramids are formed. Each level of the Laplacian pyramid is then input to a number N of oriented filters. Of course, any other kind of steerable filters could be used. Four filters are shown in FIG. 1. Each filter is set to preferentially pass a particular desired image orientation: filter 102 passes information that has a passband which is centered at 0° orientations, filter 104 passes information centered at 90° orientations, filter 106 passes information centered at 180° orientations and filter 108 passes information centered at 270° orientations. Each filter has 1 octave separation in scale. Each of the filters is preferably a two-dimensional Gabor function, which is a variety of orientation-selective bandpass filter.

The outputs of the filters include respective filtered images 110, 112, 114, 116. The images are stored in memory 120, which can be a working RAM for a processor, or the cache memory within the processor.

The particular components in the filtered images correspond to the selected filtering technique. The example in FIG. 1 shows four orientations of filters being used. This is the preferred number of filters for obtaining the advantages of the present invention. The authors have shown that the images 110–116 span all of the possible orientationally-filtered images.

The above-described Gabor filter set uses a number of directional filters to produce outputs. Comparison of filter results shows the amount of orientation of the image. If there is a clear maximum in one of the filters, but only little response in the others, then the local neighborhood includes a dominant local orientation. In contrast, if a large fraction of the filters has a comparable response, then the neighborhood includes a distribution of oriented features. Each output of each oriented filter represents image components which occur at that filter's orientation.

Local orientation is an important image measurement. The local orientation of a pattern is one property that allows a description of complex image features. The orientation magnitude at a given point, represented in a vector form by a complex number, indicates the amount of orientation, so that a region with randomly distributed orientation has a very small resulting vector.

The system of FIG. 1, for example, could be used for recognizing a particular texture. Without knowing the orientation of the texture, however, the locations where the characteristics of that texture will appear in the filter outputs will likewise be unknown.

If there were an infinite range of filters extending from 0° through 360° orientation, then the characteristic texture features would appear for certain in one of those outputs. The present technique allows organizing and rearranging the information from the four filter responses to determine characteristics of the texture from these outputs. The four outputs are treated as samples of a continuous waveform.

To recognize the texture in the images 110–116 from the filter system shown in FIG. 1, the preferred system uses a processing element to combine outputs in a way such that one part of the image stays the same throughout all rotations. That part is the rotation invariant part. Another part of the image (the actual angle) varies when rotated. The present invention defines a system that interprets this information so that both pieces of information can be obtained independent of orientation. The combination forms a new value which is also stored in the memory.

Briefly stated, this is done according to the present invention by using the pyramid filters to obtain components indicative of areas of the image. This information obtains various information across all of the orientations and several scales of images 110, 112, 114, 116. The corresponding information areas are labelled 130, 132, 134, and 136 in FIG. 1.

The information indicative of these areas at each scale are combined according to the present invention to form a vector containing samples of the continuous orientation information. This vector is stored in memory 120, and used to reconstruct all of the orientation information. This is done according to the present invention by outputting to a discrete Fourier transform ("DFT") unit 150. The DFT unit can be a dedicated digital signal processor ("DSP"), or a suitably programmed processor. Since the vector of the sampled orientation estimation contains only four real values, the processing required for the computation of the DFT is minimal. In the latter case, the memory is preferably the internal or external cache for the processor, although it can also be the working memory. The system of the present invention obtains an output from the DFT unit which is represented as a complex number. Whereas the original image is comprised of pixels which are real-valued, the result of the DFT step is to produce an image comprised of complex numbers at each local pixel. Each complex number or "vector" represents the dominant orientation strength and angle at the corresponding pixel location in the input image. Importantly, the DFT is carried out not on the image itself, but on samples formed from the set of filtered images corresponding to information about each area of the input image.

The filters 102–108 are called oriented filters, since they pass image information indicative of a particular orientation. Oriented filters are described in *The Design and Use of Steerable Filters* and *Deformable Kernels for Early Vision*.

Figure 2:
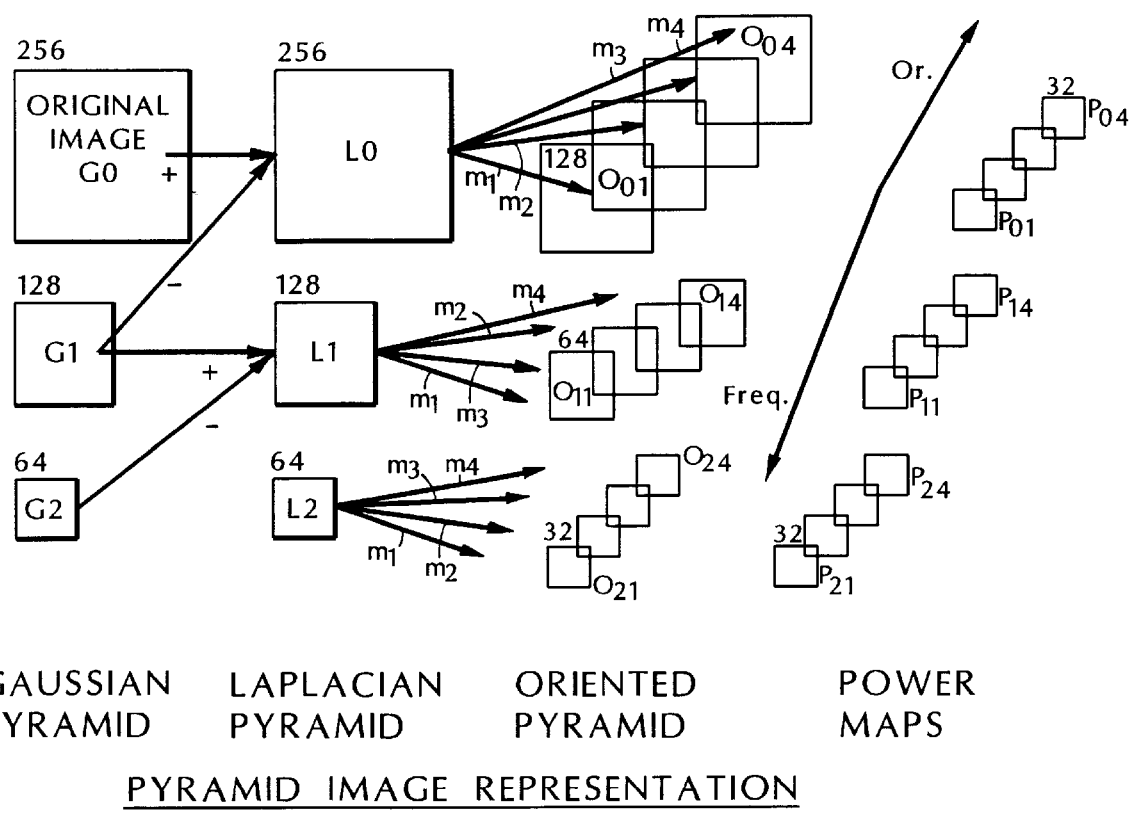
FIG. 2 shows a specific filtering operation used according to the present invention.

The specific filtering operation is shown in FIG. 2. An oriented Laplacian pyramid is used to provide a set of orientation-selective bandpass filtered versions of the input textures. Three scales are used with octave spacings and four orientations per scale spaced 45° apart. The set of oriented filters are preferably complex exponentials modulated by Gaussians acting on the Laplacian pyramid levels. The filter functions are shown in FIG. 2, and use conventionally-known Gaussian & Laplacian equations.

More specifically, in order to obtain oriented information from the filtered responses, the Laplacian pyramid is used to form an oriented pyramid. The oriented pyramid is formed by first modulating different levels of the Laplacian pyramid with a set of oriented complex two-dimensional sinusoids, followed by a low pass filtering operation using a separable low pass filter and then subsampling as shown below. Filters in the form of Gaussians modulated by complex sinusoids are called Log-Gabor filters.

The four orientations are obtained by modulating the respective levels of the Laplacian pyramid by the following complex sinusoids.

$$m_1(x,y)=e^{i(\pi/2)x} \quad (1)$$

$$m_2(x,y)=e^{i(\pi\sqrt{2}/4)(x+y)} \quad (2)$$

$$m_3(x,y)=e^{i(\pi/2)y} \quad (3)$$

$$m_4(x,y)=e^{i(\pi\sqrt{2}/4)(y-x)} \quad (4)$$

These four modulators differ only in their orientations, which are 0°, 45°, 90° and 135°, respectively. The present invention preferably uses a Filter-Subtract-Decimate ("FSD") Laplacian pyramid as known in the art.

These filtered versions can be low pass filtered, or band pass filtered, or preferably a combination thereof as shown in FIG. 2. Referring to the input image as $G_0$, the decreasing-resolutions-low-pass-filtered versions will be labeled $G_1$–$G_N$. The corresponding band pass filtered versions are labeled $L_0$–$L_N$. Each image can be described, therefore, according to the following equation:

$$G_{n+1}^0 = W * G_n; \quad L_n = G_n - G_{n+1}^0$$

$$G_{n+1} = \text{Subsampled } G_{n+1}^0$$

The subsampling is defined as follows.

$$0_{n\alpha} = LPF\left[e^{(i\vec{k}\alpha \cdot \vec{r})} L_n[x,y]\right]$$

where $0_{n\alpha}$ is the oriented image at scale n and orientation $\alpha$, and $\vec{\alpha r} = x\vec{i} + y\vec{j}$ (x and y are the spatial coordinates of the Laplacian image), $$\vec{k}_\alpha = (\pi/2)[\cos\theta_\alpha \vec{i} + \sin\theta_\alpha \vec{j}] \text{ and } \theta_\alpha = (\pi/N)(\alpha-1), (\alpha=1 \ldots N).$$

The outputs of the filters in FIG. 2 represent coefficients of the image. These coefficients are used to form feature samples which describe areas of the image. These feature samples describe the local characteristics of the original image. The preferred feature samples used according to the present invention are 15 dimensional feature samples—including 4 oriented components per scale together with a non-oriented component which is extracted from the Laplacian pyramid. The feature samples are preferably stored as vectors, which contain samples of a continuous feature curve per scale across orientation space. Note that this "vector" of responses is distinct from the usage of the term "vector" to describe a single complex number. Images are represented as rectangular matrices with floating point grayscale values. The convolution kernel is obtained by forming the outer product of a one dimensional separable filter. Feature vectors are formed from the outputs of the oriented filters, preferably describing the local characteristics in 8×8 windows. This feature curve defines the texture's response to any oriented filter in the 360° space. The techniques of the present invention also facilitate interpretation of this information, to allow determining information as desired. This information can be used for any recognition task, including pattern recognition, texture recognition or the like.

As described above, each feature sample describes the component make up of an area of the image. These image components are the same for all orientations of the image, but their positions in the curve may be different. The question, then, is how this information can be used. The curve which is used according to the present invention preferably has the characteristic that as the input texture is rotated, its feature vector, which contains samples of the continuous curve $f_c(\theta)$, shifts across the orientation axis.

Visualizing the features in this way, we can consider the oriented elements of the feature vectors for a given texture to be samples of a continuous feature "waveform" unique to that texture. We know that the waveform is periodic over 180° rotations of the input texture, since orientation is a 180°-periodic measurement. Therefore, this can be considered as an optical sampling of a periodic element.

A part of the representation is the same for all rotations—this is a rotation invariant representation for the sample curve.

If there were filters oriented at 5° increments, then the same cyclic shifts would again be apparent, but with 5° shifts, and with considerably longer feature vectors. Taking this to its limit, as the number of filters approached infinity, an infinitely fine orientational resolution would be obtained—providing a seamless translation of filtered characteristics as the input image is rotated. This would provide all the possible information about the image, but would be wasteful of filters and very expensive. The present inventors have devised a novel interpolation scheme based on a linear transformation of the outputs of a steerable set of filters. Conceptually, the steerable filter scheme uses a few "actual" filters at a chosen set of fixed orientations that act on the image, and numerous intermediate or "phantom" filters whose results can be synthesized even though those actual filters are not in place.

If we take an audio signal, for example, and sample it at the Nyquist rate starting at two different times, we get two sample sets which differ only by a time shift. This same kind of "waveform" can be determined from the feature samples. By properly analyzing this sample, we can determine all the information about the oriented structures throughout the image.

The Laplacian pyramid returns three sets of four images (at 3 different scales) for every filtering operation. These sets are used to form feature samples as follows. First, level 0 and 1 of the oriented pyramid are low pass filtered and down-sampled to be the size of the smallest level of the oriented pyramid. Then a set of vectors is assembled. These vectors have a length of 15. Twelve entries of the vectors are filled with elements from the matrix from the above-discussed level, and the other three elements are filled with local non-oriented powers from the three levels of the Laplacian pyramid. The preferred vector, therefore, is a vector of length 15. The entries of the vector respectively indicate 0° orientation, 45° orientation; 90° orientation; 135° orientation; and non-oriented components; for each of levels 0, 1 and 2. Each vector represents information about the neighborhood.

This will be explained in more detail with reference to the following example. Consider a texture oriented at any arbitrary angle, and the outputs from the system shown in FIGS. 1 and 2. The oriented features in the characteristic feature vector for a texture at 0° displays a cyclic shift in response to 45° rotations of the input texture. If a texture oriented at 0° had the representative feature vector, for example:

$f_{0°}$=[5 3 1 3 10 6 4 2 4 9 5 2 1 2 9]

Then at 45° it would have the following feature vector:

$f_{45°}$=[3 5 3 1 10 4 6 4 2 9 2 5 2 1 9]

and at 90°:

$f_{90°}$=[1 3 5 3 10 2 4 6 4 9 1 2 5 2 9].

The non-oriented elements (the numbers 10, 9 and 9) do not shift. The oriented elements shift depending on the orientation. This example shows how these feature vectors include data that will allow a prediction of what the image will look like at any filter orientation multiple of 45°. The techniques of the present invention more generally allow determination of the way the output will look at any orientation.

As described above, the present invention preferably uses four oriented components so N=4. Each level of the pyramid is thus modulated according to the following sinusoids.

$$m_1(x,y)=e^{i(\pi/2)x}; m_2(x,y)=e^{i(\pi\sqrt{2}/4)(x+y)}$$

$$m_3(x,y)=e^{i(\pi/2)x}; m_4(x,y)=e^{i(\pi\sqrt{2}/4)(y-x)}$$

These four modulators differ only in orientations of 0°, 45°, 90° or 135° for $m_1$–$m_4$. They are rotated about the center of the image relative to one another, and the modulating frequency remains constant for each level of the pyramid.

Therefore, conceptually, the pyramid provides a computationally efficient scheme to extract orientation selective information about the image at several scales.

We may also consider this filter over the 180° space using symmetry considerations. As the input texture is rotated, its feature curve $f_c(\theta)$ shifts across the orientation axis. Conceptually, the sample points cycle along the continuous curve as the element is rotated.

The above discussion provides a description of how steerable filters can be used to form a general technique for determining the steering coefficients for arbitrary steerable filters. A crucial observation by the inventors of the present invention is a way to interpret this data to allow determinations at any angle. This is preferably done according to the present invention by manipulating the oriented filter outputs with the DFT to produce orientation map information including both phase and magnitude information.

The inventors of the present invention recognized that the oriented elements of the feature sample for a given texture can be considered as samples of a continuous feature "waveform" unique to that texture. This waveform is periodic with a period of 180°. This scenario is analogous to the sampling of audio waveforms at the Nyquist rate. If two audio waveforms differ by only a time shift, the Nyquist rate is the same for both waveforms. The samples themselves will be numerically different since they occurred at different locations in the waveform. However, each set of samples can be used to reconstruct the original shifted versions of the continuous signal.

The Fourier transform is a mathematical operation that maps a time domain function x(t) to a frequency domain function x(jω). The Fourier transform can be written as $$X(j\omega) = \int_{-\infty}^{\infty} x(t)e^{-j\omega t} dt.$$

Discrete Fourier transform ("DFT") is a Fourier transform of a sampled signal x(n) indicative of the time domain function x(t). If the signal x(t) is uniformly sampled and converted to x[n], and N is the number of discrete samples, then the Fourier transform integral above can be replaced by the summation:

$$X(j\omega) \cong T \sum_{n=-\infty}^{\infty} x(nT)e^{-j\omega nT},$$

This yields uniformly spaced values for the frequency ω.

Thus the DFT breaks down the time-domain signal in terms of a harmonically-related set of discrete frequencies. The bin number K is used to specify the particular harmonic of the fundamental frequency. The amplitude of each bin gives a measure of the power spectrum since power is related to the square of the amplitude.

Consider again the above continuous feature waveform. [We can take an ideal sinusoidal grating texture at orientations of 0° to 45° to obtain 10 feature vectors, and then form a companion set of 10 other feature vectors. The contents of each companion feature vector are the 4-point discrete Fourier transforms of the oriented filtered elements for each level.] To illustrate, if an original feature vector consisted of $f_{orig}=[f_1\ f_2\ f_3\ f_4\ f_5\ f_6\ f_7\ f_8\ f_9\ f_{10}\ f_{11}\ f_{12}\ f_{13}\ f_{14}\ f_{15}]$ then the companion feature vector would be of the form $f_{comp}=[\hat{f}_1\ \hat{f}_2\ \hat{f}_3\ \hat{f}_4\ \hat{f}_5\ \hat{f}_6\ \hat{f}_7\ \hat{f}_8\ \hat{f}_9\ \hat{f}_{10}\ \hat{f}_{11}\ \hat{f}_{12}\ \hat{f}_{13}\ \hat{f}_{14}\ \hat{f}_{15}]$ where $f_n$ represents an original feature vector component and $\hat{f}_k$ represents a transformed component. The N-point DFT of such a discrete sequence $f[n]$ is defined as $$F[k] = \sum_{n}^{N-1} f[n]e^{-i2\pi nk/N} \quad k = 0, 1, \ldots, N-1 \tag{46}$$

In the preferable case, N=4 and $f[n]$ represents a sequence of four feature vector entries for a given scale:

$$F[k] = \sum_{n}^{3} f[n]e^{-i\pi nk/2} \quad k = 0, 1, 2, 3 \tag{47}$$

For illustrative purposes, this summation can be rewritten in the form of a matrix product, where $f_1$ through $f_4$ represent a group of four oriented components from a feature vector, and the square matrix contains the roots of unity arrived at by evaluating $e^{-i\pi nk/2}$ over all k and n:

$$\begin{bmatrix} 1 & 1 & 1 & 1 \\ 1 & -i & -1 & i \\ 1 & -1 & 1 & -1 \\ 1 & i & -1 & -i \end{bmatrix} \begin{bmatrix} f_1 \\ f_2 \\ f_3 \\ f_4 \end{bmatrix} = \begin{bmatrix} \hat{f}_1 \\ \hat{f}_2 \\ \hat{f}_3 \\ \hat{f}_4 \end{bmatrix}$$

In this form, the inventors recognized that the terms in the transformed sequence of points evaluates to:

$$\hat{f}1 = f1+f2+f3+f4 \tag{6}$$

$$\hat{f}2=(f1-f3)+i(f4-f2) \tag{7}$$

$$\hat{f}3=f1-f2+f3-f4 \tag{8}$$

$$\hat{f}4=(f1-f3)-i(f4-f2) \tag{9}$$

Hence, $\hat{f}_1$ represents the DC component, since it is the sum across all four components. This term is rotation invariant. The terms $f_2$ and $f_4$ correspond to the first positive and negative harmonic, respectively, and will be conjugates of one another since the input sequence is real. For this reason, $f_4$ is extraneous information. The $f_3$ term corresponds to the Nyquist frequency, which is the highest frequency harmonic assumed to be contained in the feature waveform.

The DFT, therefore, can be used to create companion feature vectors that are invariant in magnitude and reveal the rotation of the input texture through their phase. This would follow from the property of the DFT whereby a shift in one domain effects a modulation in the other domain.

This information is the same independent of the image's position. The inventors of the present invention use this method to produce rotation-invariant feature information. A set of filters which span orientation space and form a steerable basis is formed. Feature vectors are formed from the outputs of these oriented filters. These feature vectors describe the local characteristics in 8×8 windows of the original image. The feature vectors are 15-dimensional, and include the 4-oriented components per scale together with a non-oriented component per scale.

Now, consider conceptually what has been mathematically described above. Assume that an image, oriented vertically, of a highly textured material such as corduroy or denim. The present system obtains samples from the oriented filters at the specific angles of 0°, 45°, 90° and 135°. We want to infer the orientation of the lines in the image from the output of this information, based on the filter responses. Here, since the textures are oriented at 90°, the 90° filtered image will be the brightest, that is, it will have the largest response to the material. This works almost perfectly if the image is oriented at 90°. From this, we could determine that the overall orientation is at 90°. However, it does not work quite so well when the image is at an orientation which is not a multiple of the orientation angles of the filters. If we limit our estimate to the angle of the filter with the maximum response, we would be unduly limiting our resolution.

The present invention defines a technique that essentially interpolates the filter outputs in a way which obtains all of the desired information. The above mathematics explains how this is done. Mathematically, we look at each area of the image. We can associate with this area of the image, the responses from all the filters, i.e. four responses. We take the DFT of those four points and by so doing, essentially we reverse-engineer the responses to obtain the underlying wave from the samples of the continuous feature waveform that we have detected. The DFT associates the samples with the sinewave that is provided with its amplitude which is interpreted as orientation strength; and its phase which is interpreted as orientation angle.

One preferred use of this system, therefore, is to sense characteristics of textures in a way which is independent of the rotational orientation of the texture.

The DFT can therefore be used to create companion feature vectors that are invariant in magnitude and reveal the rotation of the input texture through their phase.

Figure 3:
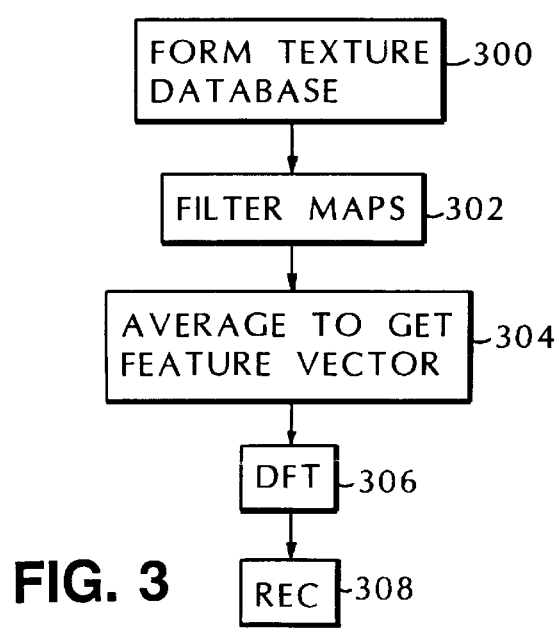
FIG. 3 shows a flowchart demonstrating how textures are recognized from a database.

The preferred application of recognizing characteristics of textures independent of their orientation is described herein. The recognition process uses the steps shown in the attached FIG. 3. First, a multiple texture database is formed at step 300. For example, this is a thirty or more texture database including image resolutions of 256×256. Larger texture databases are better, but the database is limited by constraints including available memory.

A set of non-overlapping 64 by 64 windows are extracted. Twelve of these windows are used for training and four different ones are used for testing. The test set is constructed by rotating each of the test windows by 5° increments between 5 and 50°.

The recognition process first passes the 64×64 texture patch through the steerable pyramid to get 15 of the 8×8 filter maps at step 302. Then, the 8×8 filter maps are averaged to produce one representative feature vector per 64 by 64 input window at step 304. This extracted feature vector is DFT encoded at step 306 to generate the companion feature vector $\hat{f}$ as described above. Then, the magnitudes of the set of DFT encoded feature vectors are presented to the classification system for recognition at step 308. The classification system can be one of a standard set of statistical methods, neural-network classifiers and more.

After recognizing the texture in this way, the phase information from the DFT representation is used to estimate the orientation of the test input. Here, the error between the true rotation angle and the estimated rotation angle may be obtained.

Another application of the above-discussed structure and operation is for detecting local orientations in a digital gray-scale image. This is done to obtain a collection of orientation angles and orientation strengths for a given image. The image is called the "orientation map" for that image. The orientation map could in principle be overlaid on the original image to highlight the orientation angle and strength of the gray-scale features throughout the image. Conceptually speaking, the production of an orientation map involves three steps:

1) Preprocessing—for example, using a Laplacian for edge enhancement.
2) Oriented filters using the oriented Gabor kernel filters.
3) Extraction of orientation information from the filter output powers using the above described DFT method.

Another technique contemplated according to the present invention is correction of offset to increase dynamic range. As described above, the techniques of the present invention allow determining the DC offset or sum of the oriented filter responses. If that DC offset is very high, it means that no clear dominant orientation is present. The orientation map can be processed by dividing each vector magnitude by the DC component $f_1$ corresponding to that image location. Thus, equally oriented image regions with different contrast will be represented by the same vector.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A device for determining orientation information throughout an image, comprising:

a first element operating to produce information indicative of an image to be analyzed;

a plurality of oriented filters, each receiving said information, each oriented filter having an orientation setting, and each oriented filter outputting information indicative of a component of said information which has an orientation passband centered at said orientation setting, to produce a set of filtered values, each filtered value including different information than each other filtered value;

a memory element, storing said set of filtered values; and a processing device, operating on said set of filtered values in said memory element to produce both rotation invariant information indicating a magnitude of orientation information of said image, and rotation variant information indicating specific local orientations in said image, wherein said processing device operates on said set of filtered values by performing a discrete Fourier transform thereon, to obtain a complex value with a magnitude which indicates said rotation invariant information and with a phase which indicates said rotation variant information.

2. A device as in claim 1 wherein said oriented filters are steerable pyramid filters.

3. A device for determining orientation information throughout an image, comprising:

a first element operating to produce information indicative of an image to be analyzed;

a plurality of oriented filters, each receiving said information, each oriented filter having an orientation setting, and each oriented filter outputting information indicative of a component of said information which has an orientation passband centered at said orientation setting, to produce a set of filtered values, each filtered value including different information than each other filtered value;

a memory element, storing said set of filtered values; and a processing device, operating on said set of filtered values in said memory element to produce both rotation invariant information indicating a magnitude of orientation information of said image, and rotation variant information indicating specific local orientations in said image, wherein said processing device converts said set of filtered values into a frequency domain representation, wherein said processing device forms feature vectors from said filtered values, each said feature vector including a plurality of corresponding points from a plurality of said filtered values, at least one of said feature vectors representing rotation invariant information.

4. A device as in claim 1 wherein said processing device operates on said set of filtered values to produce a continuous feature vector that includes data which represents a prediction of the filter responses at any orientation.

5. A device as in claim 4 further comprising a database memory storing information about a plurality of textures, and wherein said processing device compares processed filtered values in the memory element to a plurality of filtered elements in the database to determine a closest match therebetween.

6. A system as in claim 2 wherein said steerable filters produce multiple output, each output indicative of a particular component resolution of said image, said filtered values including multiple orientations and multiple resolutions of the image.

7. A system as in claim 2 wherein said filters have orientations each of 0°, 45°, 90°, 135°, and 0.5 octave or 1 octave separation in scale.

8. A device as in claim 6 wherein said processing device operates on said set of filtered values by performing a discrete Fourier transform thereon.

9. A device for determining orientation information about an image, comprising:
a first element operating to produce information indicative of an image to be analyzed;
a plurality of oriented filters, each receiving said information, each oriented filter having an orientation setting, and each oriented filter outputting information indicative of a part of said information which has an orientation passband centered at said orientation setting to produce a set of filtered values, each filtered value including different information than each other filtered value;
a memory element, storing said set of filtered values; and
a processing device, operating on said set of filtered values in said memory element to produce sample information, each item of said sample information including information from said filtered values, and said sample information including information from which other orientations, other than an orientation from which said sample information was obtained, can be determined, wherein said processing device performs a discrete Fourier transform on said set of filtered values by converting the samples along the orientation axis into a frequency domain representation, and wherein said frequency domain representation includes information which is rotation invariant.

10. A device as in claim 9 wherein said oriented filters are pyramid filters, each of which is oriented to have a passband centered at a specific orientation setting, and each of which produces a plurality of successively filtered outputs, said sample information including information from each of said plurality of successively filtered outputs.

11. A device as in claim 10 wherein said sample information includes vectors, each vector indicating a specific area of the image, and each area formed from a plurality of said components.

12. A device as in claim 11 wherein each vector element also includes information from multiple orientations.

13. A method of determining orientation information about images containing multiple orientations at a point, comprising:
producing a signal indicative of an image to be analyzed, said producing step includes acquiring an image with a camera;
filtering said signal at orientations centered at a plurality of different settings to obtain a set of filtered values, each filtered value including information about different information than each other filtered value;
storing said set of filtered values in memory;
operating on said set of filtered values in said memory to produce vector information, each vector information including information from said filtered values; and
interpreting said vector information to obtain a continuous signal indicative of a continuous feature waveform indicative of all orientation within said image,
wherein said filtering step filters said signal to obtain a plurality of different image components; each said image component being part of said vector,
wherein said interpreting comprises changing said vector from the time domain to the frequency domain to obtain frequency invariant information thereof, and
wherein said changing comprises discretely Fourier transforming samples of oriented filtered outputs.

14. An element for recognizing a texture, comprising:
an image receiving element, receiving information indicative of an image of the texture to be processed;
a set of oriented pyramid filters, respectively producing multiple outputs respectively indicative of components of said information at different levels of resolution, to produce filtered information;
each part of said information indicative of a particular orientation of an image, and indicative of a resolution of said image lower than an input resolution of said image; and
a processing device, processing said filtered information to obtain first and second information therefrom;
said first information indicative of an overall magnitude of the information and said second information indicative of the orientation of said information, wherein said processing device carries out a discrete Fourier transform on the information, and obtains and interprets outputs of said discrete Fourier transform as said parts; and
said processing device compares said first and second information to other determined values, to recognize a texture in any rotated orientation.

15. A device as in claim 14 wherein said filters are oriented pyramid filters which produce a plurality of lower resolution images and wherein there are at least three of said pyramid filters, each of pyramid filters producing a lower resolution image than a previous one of said pyramid filters.

16. A device as in claim 15 wherein said processing device produces feature vectors which include information from each of said pyramid filters said feature vectors including information indicating rotation variant and rotation invariant parts.

17. A method of processing an image comprising the steps of:
determining components of the image, including at least a first component with coarse details and a second component with finer details at discrete orientations centered at discrete orientation center passbands;

storing said first and second components in a memory;

arranging contents of said memory into a vector form, said vector including elements from said different resolution components, and elements from said discrete orientation center passbands; and processing said vector to obtain information indicative of orientation center passbands of the image other than said discrete orientation center passband, wherein said processing includes carrying out a conversion on said vector to convert information in said vector from time domain to frequency domain, and to obtain orientation independent information therefrom, and wherein said vector is a feature vector having components whose positions shift along an orientation axis depending on a rotation of said input image; and said time domain to frequency domain conversion is a discrete Fourier transform.

18. A method as in claim 17 wherein one element of the feature vector is a non-oriented element, and other elements of the feature vector are oriented elements which shift depending on the orientation.

19. A method as in claim 18 wherein said analyzing analyzes harmonics of the feature curve and phase thereof.

* * * * *